United States Patent [19]
Mori et al.

[11] 3,962,390
[45] June 8, 1976

[54] METHOD OF PRODUCING COMPOSITE FOAMED SHAPED ARTICLES FROM THERMOPLASTIC RESINS

[75] Inventors: Hisayuki Mori; Eiichi Adachi, both of Nara; Yoji Noguchi, Kyoto, all of Japan

[73] Assignee: Sekisui Kagaku Kogyo Kabushiki Kaisha, Osaka, Japan

[22] Filed: May 21, 1974

[21] Appl. No.: 471,997

Related U.S. Application Data

[63] Continuation-in-part of Ser. No. 97,382, Dec. 11, 1970, abandoned.

[30] Foreign Application Priority Data
Dec. 11, 1969  Japan................................ 44-99860

[52] U.S. Cl.............................. 264/45.4; 264/45.7; 264/54; 264/113; 264/126; 264/310; 428/220; 428/315; 428/339
[51] Int. Cl.² ...................... B29C 5/04; B29D 27/00
[58] Field of Search................. 264/54, 53, DIG. 18, 264/45.4, 45.7, 126, 113, 310; 428/220, 315, 339

[56] References Cited
UNITED STATES PATENTS

| | | | |
|---|---|---|---|
| 3,455,483 | 7/1969 | Inklaar.............................. | 264/54 X |
| 3,457,205 | 7/1969 | Nonweiler............................ | 264/53 |
| 3,814,778 | 6/1974 | Hosoda et al................ | 264/DIG. 18 |

FOREIGN PATENTS OR APPLICATIONS

| | | | |
|---|---|---|---|
| 2,061,112 | 12/1970 | Germany.......................... | 264/45.7 |

OTHER PUBLICATIONS

*Modern Plastics Encyclopedia* 1968, "Plastics Properties chart": New York, McGraw–Hill, c. 1967, vol. 45, No. 1A, Sept. 1967, pp. 30–31, 38, 42–44 and 46.
*CRC Handbook of Chemistry and Physics*, 1974–1975 55th Edition, Robert C. Weast, Editor, Cleveland, Ohio, CRC Press, c. 1974, pp. F–96 and F–109.

*Primary Examiner*—Philip Anderson
*Attorney, Agent, or Firm*—Wenderoth, Lind & Ponack

[57] ABSTRACT

A method of producing shaped articles of thermoplastic resin having a non-foam layer and foam layer, which comprises introducing into a mold thermoplastic resin particles not containing a heat-decomposable blowing agent and thermoplastic resin particles containing such a blowing agent and having a greater heat capacity than said resin particles not containing a blowing agent, heating the mold and, in the meantime, moving said particles in said mold to effect the heat-melting of said particles as well as the heat-decomposition of said blowing agent.

17 Claims, No Drawings

METHOD OF PRODUCING COMPOSITE FOAMED SHAPED ARTICLES FROM THERMOPLASTIC RESINS

This is a continuation-in-part of U.S. application Ser. No. 97,382, filed Dec. 11, 1970 and now abandoned.

This invention relates to a method of producing shaped articles of thermoplastic resin having a non-foam layer and a foam layer.

Heretofore, in molding a shaped article of thermoplastic resin which is made up of a skin layer of thermoplastic resin on its outer surface and a foam layer of thermoplastic resin in the inside thereof, a method is known which comprises first introducing into a mold a thermoplastic resin for forming the skin layer, effecting the adhesion of this resin to the surface of the mold by heating and melting the resin, then forming a foam layer inside the mold by introducing and foaming a foamable thereomplastic resin incorporated with a blowing agent to integrate the skin layer and the foam layer to produce the desired shaped article of thermoplastic resin.

However, in this method the introduction into the mold of the thermoplastic resin for forming the skin layer and the introduction into the mold of the foamable thermoplastic resin for forming the foam layer must be carried out separately during the molding process, with the consequence that the mold must be made of special construction. Further, the molding cycle becomes prolonged to make this method unsuitable for large scale production. There is also the drawback that the molding operation is complicated.

According to one variation of the above-mentioned conventional two-step method, the non-foamable resin particles are first introduced into the mold, the mold is rotated and heated so that a non-foamed layer is formed. The mold is then opened to introduce the foamable resin particles into the mold, and the mold is again rotated and heated so that the foamed layer is formed on the non-foamed layer. Such a method, however, involves clumsy operations, such as introduction of the resin particles, closing the mold, rotating abd heating the mold, again opening the mold to introduce the resin particles containing the foaming agent, followed by closing the mold, and then rotating and heating the mold. This involves a great many steps, is time consuming and, of course, costly. The object of the present invention is to avoid such drawbacks.

For solving the foregoing drawbacks, a method is known in which a non-foamable thermoplastic resin having a higher density than the foamable theremoplastic resin is used, the method comprising the steps of introducing the resins into the mold at the same time, rotating the mold while heating the resins, effecting the adhesion of the non-foamable thermoplastic resin to the surface of the mold by centrifugal force by utilizing the difference in densities of the two resins to form the non-foamable thermoplastic resin layer and thereafter forming the foamable thermoplastic resin layer integrally therewith. However, in the case of this method, since there is practically no difference in the densities where the non-foamable thermoplastic resin and the foamable thermoplastic resin are of the same class, the non-foamable thermoplastic resin layer and the foamable thermoplastic resin layer cannot be formed separately. Further, even though the non-foamable thermoplastic resin is selected so as to have a higher density than that of the foamable thermoplastic resin, generally the density of the former is only a few times that of the latter. Hence, for setting up a centrifugal force, the mold must be rotated at a high speed. A further drawback is that not only must the non-foamable thermoplastic resin have a greater density than the foamable thermoplastic resin, but it also must have a lower melting point, or else a thermoplastic resin shaped article made up of a skin layer of non-foamable thermoplastic resin and a foamable thermoplastic resin layer cannot be obtained.

The object of the present invention is to provide a method of producing a shaped article of thermoplastic resin having a non-foam layer and a foam layer, the method being one which does not have the hereinbefore noted drawbacks of the conventional methods.

Thus, in accordance with the present invention, a method of producing a shaped article of thermoplastic resin having a non-foam layer and a foam layer is provided, said method comprising introducing thermoplastic resin particles not containing a heat-decomposable blowing agent in a mold along with thermoplastic resin particles containing such a blowing agent and having a greater heat capacity than the foregoing thermoplastic resin particles, heating the mold and, in the meantime, moving said particles inside the mold, thereby heat-melting the particles as well as heat-decomposing said blowing agent.

The thermoplastic resin not containing a heat decomposable blowing agent, as used herein, include such resins as polyethylene resins, polypropylene resins, styrol resins, acrylonitrile-butadiene-styrene copolymers, vinyl chloride resins, methacrylic resins, acrylonitrile-styrene copolymers, and polycarbonate resins, wherein the heat capacity of the resin particles being used is small.

On the other hand, as the thermoplastic resin containing a blowing agent, useable are those in which a small quantity of a heat-decomposable blowing agent has been incorporated in the particles of such thermoplastic resins as polyethylene resins, polypropylene resins, styrol resins, acrylonitrile-butadiene-styrene copolymers, vinyl chloride resins, methacrylic resins, acrylonitrile-styrene copolymers and polycarbonate resins. And in this case, the heat capacity of the resin particles must be greater than that of the foregoing thermoplastic resins not obtaining a blowing agent.

By a heat-decomposable blowing agent is meant a blowing agent which is decomposed by heat and evolves a gas. Examples of this blowing agent are dinitropentamethylenetetramine, dimethyldinitrosotereph-thalazide, benzene sulfonylhydrazide, toluene sulfonyl-hydrazide, azobisisobutyronitrile, diazoaminobenzene, trihydrazinetriazine, paratoluenesulfonylsemicarba-zide, oxybisbenzenesulfonylsemicarbazide and azodicarbonamide, and derivatives thereof. These may be used either singly or in combination of two or more thereof. The heat-decomposable blowing agents used are those which are in a solid form, such as in powder or particulate form. The foamable resin particles contain less than 10 parts by weight, or preferably 2 to 7 parts by weight of the blowing agents on the basis of 100 parts by weight of the resin.

In this invention we confirmed as a result of researches that shaped articles composed of a non-foam layer and a foam layer could be obtained favorably if the heat capacity of the thermoplastic resin containing a blowing agent is greater than that of the thermoplastic resin not containing a blowing agent and preferably if the following relationship holds between the two:

$$C_A/C_B = 50 \ldots \qquad (I)$$

wherein $C_A$ is the heat capacity of the thermoplastic resin particles containing a heat-decomposable blowing agent and $C_B$ is the heat capacity of the thermoplastic resin particles not containing a heat-decomposable blowing agent.

If in the foregoing relationship the value of $C_A/C_B$ becomes smaller than 50, the formation of the non-foam layer and the foam layer becomes difficult, since the thermoplastic resin particles not containing a blowing agent and the thermoplastic resin particles containing a blowing agent melt with practically no time differential. This results in a shaped article of a single-layered structure wherein the thermoplastic resin containing a blowing agent is in a state of intermixture with the thermoplastic resin not containing a blowing agent. If in the foregoing relationship the valve of $C_A/C_B$ exceeds 50, a shaped article composed of a non-foam layer and a foam layer is obtained without fail. However, as this value becomes greater, the time required for melting the blowing agent-containing thermoplastic resin becomes so much greater than that of the thermoplastic resin not containing a blowing agent. And when this value exceeds 1000, a marked retardation takes place in the time required for melting the former as compared with that required for the latter, with the consequence that a prolonged period of time becomes necessary for molding the shaped article. Hence, it is preferred from the standpoint of enhancing the molding efficiency that the value of $C_A/C_B$ be held at below 1000. Hence the satisfactory results will be brought about by using in this invention resin particles having the relationship:

$$1000 \geqq C_A/C_B \geqq 50 \ldots \qquad (II)$$

wherein $C_A$ and $C_B$ are as hereinbefore defined.

It is preferable, however, that the $C_A/C_B$ value exceeds or is equal to 100 and therefore the preferred relationship in respect to the heat capacity of the resins may be mathematically expressed as follows:

$$1000 \geqq C_A/C_B \geqq 100 \ldots \qquad (III)$$

wherein $C_A$ and $C_B$ have the meanings defined above.

The specific heats of the resin particles containing a blowing agent and those of the resin particles not containing a blowing agent can be considered to be the same in this invention in the case where the resins are of the same class. When the densities of both resins are the same in this case, the heat capacity of the resin particles become greater as the volume of the resin particles, i.e. the size of the particles, becomes greater. When the densities of the particles differ, the heat capacities vary depending upon the interrelationship of the density of the particle and its size. For example, when the product of density volume of the particle is greater, the heat capacity becomes greater. However, when the specific heats of the resins are not the same, i.e. for example, when the classes of the resins are different, the heat capacity is determined by the relationship between the three factors of specific heat of the particle, its density and volume.

More specifically, the heat capacity of the resin used is determined from the following mathematical formula:

C (heat capacity) = specific heat × volume × density
where
specific heat = specific heat of the unfoamed particles
volume = volume of the unfoamed particles
density = density of the unfoamed particles.

As the thermoplastic resin not containing a blowing agent and the thermoplastic resin containing a blowing agent to be used in this invention, those chosen are resins which, upon being heated and melted, mutually fuse into a single mass. In accordance with the invention, thermoplastic resin particles not containing a blowing agent and thermoplastic resin particles containing a heat-decomposable blowing agent and having a heat capacity greater than the foregoing thermoplastic resin particles are introduced into the mold at the same time, and heated while moving the resin particles inside the mold, whereupon the thermoplastic resin not containing a blowing agent and consisting of particles having a smaller heat capacity begins to melt first and adheres to the inner surface of the mold to form a thin layer thereon. In the meantime, the thermoplastic resin particles containing a heat-decomposable blowing agent, owing to their greater heat capacity, continue their movement inside the mold in an unmelted state and gradually congregate towards the middle of the mold. Upon further continuance of the heating and movement of the resin, the blowing agent-containing thermoplastic resin melts and the heat-decomposable blowing agent decomposes to set up foaming and hence form the foam layer.

Thus, a shaped article is formed having on its inside a foam layer and on its outside a skin layer.

When introducing a mixture consisting of thermoplastic resin particles not containing the heat-decomposable blowing agent and the thermoplastic resin particles containing the heat-decomposable blowing agent into the mold, it is desired that the particles be mixed homogeneously. With the particles being mixed homogeneously, the foamed layer and the non-foamed layer are formed uniformly in the mold. When the particles are not mixed homogeneously, however, the layers are often not uniformly formed.

Thermoplastic resin particles containing a heat-decomposable blowing agent in which the heat capacity of the particles is greater than that of the thermoplastic resin particles not containing a blowing agent and furthermore in which the density of the latter particles is less than that of the former particles may also be used in this invention. In this case, when heating of the resins introduced into the mold is carried out while moving the resins inside the mold, the thermoplastic resin particles not containing a blowing agent start melting and spontaneously adhere to the inner surface of the mold to form a thin layer thereon. This is followed by the movement and congregation of the blowing agent-containing thermoplastic resin particles toward the middle of the mold interior, melting of the particles and heat decomposition of the heat-decomposable blowing agent, whereupon a foam layer of the thermoplastic resin is formed. This is followed by the integral fusion of the foam layer with the foregoing thin layer to yield a shaped article of thermoplastic resin.

If in the foregoing case, the heat capacity of the thermoplastic resin particles containing a heat-decomposable blowing agent is greater than that of the thermoplastic resin particles not containing a blowing agent, a shaped article composed of a non-foam layer and a foam layer resulting from the foaming of the heat-decomposable blowing agent can be obtained even though the density of the thermoplastic resin particles not containing a blowing agent is lower than that of the thermoplastic resin particles containing a heat-decomposable blowing agent. Hence, it is not necessary to rotate the mold at high speeds as in the case of the conventional methods which mold the shaped articles composed of non-foamable thermoplastic resin and a foamable thermoplastic resin by means of centrifugal force, using a non-foamable thermoplastic resin having a higher density than that of the foamable thermoplastic resin.

According to the invention, it is possible to obtain the intended products of the present invention even in those cases where the heat capacity of thermoplastic resin containing a heat-decomposable blowing agent is greater than that of the thermoplastic resin not containing a blowing agent but the melting point of the blowing agent-containing thermoplastic resin is lower than that of the thermoplastic resin not containing the blowing agent. In this case, when the resin particles introduced into the mold are heated while being moved, the blowing agent-containing thermoplastic resin having the lower melting point starts to melt first and the thermoplastic resin not containing a blowing agent starts to melt next but, even in this case, while the thermoplastic resin not containing a blowing agent is in a completely melted state, the melting of the blowing agent-containing thermoplastic resin is not finished, with the consequence that as the resins move inside the mold, the thermoplastic resin particles not containing a blowing agent melt-adheres to the inner surface of the mold to form a thin layer thereon. Next, the blowing agent-containing thermoplastic resin whose melting is as yet incomplete, while moving, congregates toward the middle of the mold interior and forms a foam layer of thermoplastic resin as a result of the heat decomposition of the heat-decomposable blowing agent to yield a shaped article of thermoplastic resin which is composed of said foam layer and the aforesaid thin layer, which are integrally fused together.

As suitable methods for accomplishing the movement of the resin particles introduced into the mold, there is employed a method of mounting the mold atop a table which is adapted to oscillate from side to side thereby to transmit this oscillatory movement to the resin inside the mold or a method of mounting the mold on a rotating shaft and thus causing the resin to move inside the mold by rotating same by means of the rotation of the shaft.

Especially, in the case where the method of rotating the mold by means of a rotating shaft is employed, the resin inside the mold is heated while making uniform contact with the whole of the mold surface as a result of the rotation of the mold, with the consequence that a product having a uniform shell thickness can be manufactured.

For cooling the mold, a method of dipping the mold in water or a method of spraying the mold with water is satisfactory.

In the method of manufacturing the invention shaped article of thermoplastic resin having a non-foam layer and a foam layer, thermoplastic resin particles not containing a blowing agent and thermoplastic resin particles containing a heat-decomposable blowing agent and having a greater heat capacity than the foregoing thermoplastic resin particles are introduced into a mold and the resin particles are heat-melted by heating the mold while moving the resin inside the mold. Hence, the thermoplastic resin particles not containing a blowing agent and of smaller heat capacity starts melting first to become adhered to the inner surface of the mold to form a non-foam thin layer composed of the thermoplastic resin not containing a blowing agent. The blowing agent-containing thermoplastic resin continues its movement in the mold and becomes melted as the heating is continued, whereupon the blowing agent is decomposed to form a foam layer inside the mold in inner relationship to the aforesaid thin layer. Hence, a shaped article of thermoplastic resin having a thermoplastic resin foam layer surrounded by a thermoplastic resin skin layer is formed. Since the resin particles melt in the mold, the skin layer composed of a thermoplastic resin not containing a blowing agent and a thermoplastic resin foam layer formed as a result of the foaming of the heat-decomposable blowing agent by its heat decomposition become fused integrally to provide a shaped article of thermoplastic resin having great mechanical strength.

In accordance with the invention method, the thermoplastic resin not containing a blow agent, the resin necessary for forming the skin layer, and the thermoplastic resin containing a heat-decomposable blowing agent and composed of resin particles having a greater heat capacity than the foregoing resin particles are introduced into the mold at the same time and therefore the only operation required is to heat-melt the resin by heating the mold while moving the resin particles inside the mold. Thus is manufactured a shaped article of thermoplastic resin having a thermoplastic resin layer containing no foams and a foam-containing thermoplastic layer formed by the heat decomposition of a heat-decomposable blowing agent. Hence, there is no necessity of carrying out the operation of introducing the resin into the mold in two stages as in the conventional method, in which first only the non-foamable thermoplastic resin is placed in the mold and heat-melted and thereafter the foamable thermoplastic resin is placed in the mold and foamed by heat-melting. Thus, the manufacturing process is greatly simplified, and the time required for the molding is shortened to make the invention method suitable for large-scale production.

Further, when thermoplastic resin particles not containing a blowing agent and thermoplastic resin particles containing a blowing agent having the relationship of the previously indicated expression (I), and preferably expression (III), are used, shaped articles having a non-foam layer and a foam layer, which are discrete, can be produced.

According to the invention, when thermoplastic resin particles not containing a blowing agent and thermoplastic resin particles containing a heat-decomposable blowing agent and having a greater heat capacity than the foregoing thermoplastic resin and further in which the density of the latter is greater than that of the former is used, a shaped article composed of a non-foam layer and a foam layer can be obtained. This obviates the necessity, as in the conventional method, of forming the non-foamable thermoplastic resin layer and the foamable thermoplastic resin layer by means of centrifugal force by high speedy rotation of the mold.

Further, in accordance with the invention, in the case where the heat capacity of the decomposable blowing agent-containing thermoplastic resin particles is greater than that of thermoplastic resin particles not containing a blowing agent and, in addition, the melting point of the former is lower than that of the latter, the blowing agent-containing thermoplastic resin particles starts melting first, followed by melting of the thermoplastic resin particles not containing a blowing agent. However, since the melting of the former is not completed even though the latter is in a completely melted state, the particles of the former continue their movement to the middle of the mold while in the meantime the blowing agent continues to decompose with the consequence that a shaped article composed of a non-foam layer and a foam layer is produced.

The following examples are given for further illustration of the invention. In the example, the parts are on a weight basis.

EXAMPLE 1

| | |
|---|---|
| Polyethylene resin particles not containing a heat-decomposable blowing agent, particle size German screen No. 20 – 40 (MS 70, produced by Mitsubishi Petrochemical Co., Ltd., Japan, density 0.930 g/cm³) | 100 parts |
| Polyethylene resin particles not containing a blowing agent, particle size passing through German screen No. 30 – 40 (H2200J, produced by Mitsui Petrochemical Co., Ltd., Japan, density 0.970 g/cm³) | 200 parts |
| Blowing agent-containing polyethylene resin particles, particle diameter 1 mm, length 2mm | 300 parts |

The blowing agent-containing polyethylene particles are prepared in the following manner. Two parts of a heat-decomposable blowing agent azodicarbonamide ("Cellmic C" produced by Sankyo Chemical Co., Ltd., Japan) are mixed with 100 parts of a powdery polyethylene resin (MS 70, density 0.930 g/cm³ produced by Mitsubishi Petrochemical Co., Ltd., Japan) and molded into particles of the hereinabove indicated size by extruding from an extruder. $C_A/C_B \approx 100$.

A mixture of the foregoing polyethylene resin particles not containing a blowing agent and the blowing agent-containing polyethylene resin particles is introduced into a mold of dimensions 200 × 600 × 20 mm, after which the mold is rotated while being heated in a furnace to effect the melting and adhesion to the mold surface of the polyethylene resin not containing a blowing agent and melting of the decomposable blowing agent-containing polyethylene resin particles as well as the heat decomposition of the blowing agent and foaming of the polyethylene resin.

The molding conditions are as follows:

| | |
|---|---|
| Mold heating temperature | 250°C. |
| Mold heating time | 20 min. |
| Cooling time after heating (water immersion) | 6 min. |
| Speed of mold rotation | 20 rpm (rotation of the mold itself) 10 rpm (rotation of the mold about the shaft or which it is mounted) |

When the melting takes place in the mold, the polyethylene resin of smaller particle size and not containing a blowing agent, which has a smaller heat capacity than the blowing agent-containing polyethylene particles melts before the latter to become adhered to the mold surface and form the skin layer. The blowing agent-containing polyethylene resin particles congregate in the mold in an inner relationship to the skin layer where it is melted to heat-decompose the heat-decomposable blowing agent, with the consequence that foaming is set up to form the foam layer. This is obtained a polyethylene resin foam having a skin layer.

The skin layer of this shaped article was 1.5 mm and the foam layer was 17 mm, and the blow-up ratio of the foam layer was 6.5 X. The rigidity of this shaped article was high.

EXAMPLE 2

| | |
|---|---|
| Styrol resin particles not containing a blowing agent (MF 30, produced by Sekisui Chemical Co., Ltd., Japan). particle size German screen No. 20 – 40 | 200 parts |
| Blowing agent-containing styrol resin particles, particle diameter 1 mm, length 2 mm | 400 parts |

The blowing agent-containing styrol resin particles are prepared by mixing 2 parts of a heat-decomposable blowing agent azobisisobutyronitrile with 100 parts of a powdery styrol resin (MF 30 produced by Sekisui Chemical Co., Ltd., Japan), followed by molding into particles of the hereinabove indicated size. $C_A/C_B \approx 100$.

A mixture of the foregoing styrol resin particles not containing a blowing agent and the blowing agent-containing styrol resin particles is introduced into a mold of identical dimensions as that of Example 1, after which the resins in the mold are melted by rotating the mold in a furnace while heating it.

The molding conditions are as follows:

| | |
|---|---|
| Mold heating temperature | 220°C. |
| Mold heating time | 20 min. |
| Cooling time after heating (water immersion) | 6 min. |
| Speed of mold rotation | 20 rpm (rotation of the mold itself) 10 rpm (rotation of the mold about the shaft on which is mounted) |

In this example, since the heat capacity of the styrol resin particles of smaller size and not containing a blowing agent is less than that of the heat-decomposable blowing agent-containing styrol resin particles, the former melts before the latter to become adhered to the mold surface and form a skin layer. After completion of the melting of the styrol resin particles not containing a blowing agent, the heat-decomposable blowing agent contained in the latter becomes heat-decomposed to set up foaming of the blowing agent-containing styrol resin to thereby form the foam layer. A styrol resin foam having a skin layer is obtained in this manner. The blow-up ratio of this foam was 6.8.

EXAMPLE 3

| | |
|---|---|
| Polyethylene resin particles not containing a blowing agent (Comminuted Sumicasen G 701 produced by Sumitomo Chemical Co., Ltd., Japan) density 0.930 g/cm³, particle size passing through German screen No. 60 – 80 | 150 parts |
| Polypropylene resin particle not containing | |

-continued

| | |
|---|---|
| a blowing agent (Noprene W-501 produced by Sumitomo Chemical Co.,) density 0.910 g/cm³ particle size passing through German screen No. 60 | 150 parts |

| | |
|---|---|
| Blowing agent-containing polyethylene resin particles | 300 parts |

The foregoing polyethylene and polypropylene resin particles are mixed in advance with a supermixes.

| | |
|---|---|
| Blowing agent-containing polyethylene resin particles | 300 parts |

The flowing agent-containing polyethylene resin particles are prepared in the following manner.

Two parts of a heat-decomposable blowing agent paratoluenesulfonylsemicarbazide are mixed with 100 parts of a powdery polyethylene resin ("Hizex" 2100 GP produced by Mitsui Petrochemical Co., Ltd., density 0.955 g/cm³), after which the mixture is roll-kneaded and cut into 3-mm cubes with a cutter, $C_A/C_B \approx 1000$.

In this example, the density of the blowing agent-containing polyethylene resin particles is greater than that of the polyethylene and polypropylene resins not containing a blowing agent.

A mixture consisting of the heat-decomposable blowing agent-containing polyethylene resin particles and the previously mixed polyethylene and polypropylene resin particles is introduced into a mold having the dimensions 200 × 600 × 20 mm. The mold is then rotated in a furnace while heating it to melt the polyethylene resin particles not containing a blowing agent in the mold and cause its adhesion to the mold surface, as well as to decompose the heat-decomposable blowing agent and set up the foaming of the polyethylene resin.

The molding conditions are as follows:

| | |
|---|---|
| Mold heating temperature | 350°C. |
| Molding heating time | 18 min. |
| Cooling time after heating | air cooling 20 min. and water cooling 5 min. |
| Speed of mold rotation | 10 rpm (rotation of the mold itself) 10 rpm (rotation about the shaft on which the mold is mounted) |

Since in this example the mixture of the polyethylene and polypropylene resin particles has a smaller heat capacity than the polyethylene resin particles containing a blowing agent, the former melts in advance of the latter and becomes adhered to the mold surface to form a skin layer.

The blowing agent-containing polyethylene resin particles congregate inside the mold in inner relationship to the skin layer and is there melted and foamed by the heat decomposition of the heat-decomposable blowing agent to form the foam layer.

Thus is obtained from a polyethylene resin and a polypropylene resin, a shaped article having a skin layer of 1.5 mm thickness to which was fused a foam layer of 17 mm thickness whose blow-up ratio was 6.5 X.

EXAMPLE 4

| | |
|---|---|
| Polyethylene resin particles not containing a blowing agent (Comminuted "Sumicasen" G 701) density 0.930 g/cm³, particle size passing through German screen No. 60 – 80 | 300 parts |
| Blowing agent-containing polyethylene resin particles | 300 parts |

The blowing agent-containing polyurethane resin particles are prepared by mixing 2 parts of a heat-decomposable blowing agent trihydrazidetriazine with 100 parts of a particulate polyethylene resin ("Hizex" 2200 J, density 0.970 g/cm³), after which the mixture is roll-kneaded and cut into 3-mm cubes with a cutter, $C_A/C_B \approx 1000$.

In this example the density of the blowing agent-containing polyethylene resin is greater than that of the polyethylene resin not containing a blowing agent.

A mold of the same shape and dimensions as that of Example 3 is employed, and the molding is carried out under identical conditions as in Example 3.

Since in the case of this example the polyethylene resin particles not containing a blowing agent has a smaller heat capacity than the polyethylene resin particles containing the heat-decomposable blowing agent, the former melts before the latter and becomes adhered to the mold surface to form a skin layer.

As the mold rotates, the blowing agent-containing polyethylene resin particles gradually congregate in inner relationship to the skin layer where they are melted and the heat-decomposable blowing agent is heat-decomposed, with the consequence that foaming takes place to form a foam layer. Hence, in a shaped article of polyethylene resin is molded, which has a skin layer of 1.5 mm thickness and a foam layer of 17 mm thickness and in which the skin layer and the foam layer are integrated. The blow-up ratio of the foam layer of this shaped article was 6.5 X.

EXAMPLE 5

| | |
|---|---|
| Polyethylene resin particles not containing a blowing agent ("Hizex" 2100 GP produced by Mitsui Petrochemical Co., Ltd., Japan), density 0.955 g/cm³; particle size German screen No. 30 – 100, those on the order of No. 60 being contained in a large amount; m.p. 123 – 135°C. | 300 parts |
| Blowing agent-containing polyethylene resin particles | 200 parts |

The blowing agent-containing polyethylene particles are prepared by mixing 2 parts of a heat-decomposable blowing agent azodicarbonamide ("Cellmic" produced by Sankyo Chemical Co., Ltd., Japan) with 100 parts of a powdery polyethylene resin (MS 70 produced by Mitsubishi Petrochemical Co., Ltd., Japan, density 0.930 g/cm³), after which the mixture is roll-kneaded and cut into 2-mm cubes.

The melting point of these particles is 107° – 115°C.

In this example the melting point of blowing agent-containing polyethylene resin particles is lower than that of the polyethylene resin particles not containing a blowing agent, $C_A/C_B \approx 500$.

A mold of the same shape and dimensions as that of Example 3 is employed, and the molding is carried out under identical conditions as in Example 3.

In this example the polyethylene resin particles not containing a blowing agent melts before the polyethylene resin particles containing the heat-decomposable blowing agent and becomes adhered to the mold surface to form a skin layer.

The blowing agent-containing polyethylene resin particles gradually congregate in inner relationship to the skin layer as the mold rotates, where they are melted and the heat-decomposable blowing agent is heat-decomposed, with the consequence that foaming takes place to form a foam layer.

Thus a shaped article is obtained, having a skin layer of 1.5 mm and a foam layer of 17 mm, the blow-up ratio of which is 8.4 X.

What we claim is:

1. A method of producing shaped articles of a thermoplastic resin having a non-foam layer and a foam layer, which consists essentially of mixing thermoplastic resin particles not containing a heat-decomposable blowing agent, said resin being selected from the group consisting of polyethylene, polypropylene resins, styrol resins, acrylonitrile-butadiene-styrene copolymers, vinyl chloride resins, methacrylic resins and acrylonitrile-styrene copolymers and thermoplastic resin particles containing a heat-decomposable blowing agent, said resin being selected from the group consisting of polyethylene resins, polypropylene resins, styrol resins, acrylonitrile-butadiene-styrene copolymers, vinyl chloride resins, methacrylic resins and acrylonitrile-styrene copolymers, said heat-decomposable blowing agent being at least one member selected from the group consisting of dinitropentamethylene-tetramine, dimethyl-dinitrosoterephthalazide, benzene sulfonylhydrazide, toluene sulfonylhydrazide, azobisisobutyronitrile, diazoaminobenzene, trihydrazine-triazine, paratoluenesulfonyl-semicarbazide, oxybisbenzenesulfonyl-semicarbazide and azodicarbonamide, and derivatives thereof, wherein the said thermoplastic resin particles not containing a heat-decomposable blowing agent and said thermoplastic resin particles containing said blowing agent have the following relationship:

$$1000 \geq C_A/C_B \geq 50$$

wherein $C_A$ is the heat capacity of said thermoplastic resin particles containing a heat-decomposable blowing agent and $C_B$ is the heat capacity of said thermoplastic resin particles not containing a blowing agent; introducing the mixture thus obtained into a mold; heating the mold and, in the meantime, moving said particles in said mold to effect the heat-melting of said particles as well as the heat-decomposition of the blowing agent into a gas and thereby forming the non-foam layer derived from said thermoplastic particles not containing the blowing agent and the foam layer derived from said thermoplastic particles containing said blowing agent.

2. The method according to claim 1 wherein the thermoplastic particles containing a heat-decomposable blowing agent has a greater density as well as a greater heat capacity than the thermoplastic particles not containing such blowing agent.

3. The method according to claim 1 wherein the thermoplastic particles containing a heat-decomposable blowing agent has a lower melting point as well as a larger heat capacity than the thermoplastic resin particles not containing such blowing agent.

4. A method according to claim 1 wherein the thermoplastic resin particles not containing a heat-decomposable blowing agent and the thermoplastic particles containing said blowing agent have the following relationship:

$$1000 \geq C_A/C_B \geq 100$$

wherein $C_A$ and $C_B$ have the meanings defined in claim 1.

5. A method according to claim 1, wherein the heat-decomposable blowing agent is dinitropentamethylene-tetramine.

6. A method according to claim 1, wherein the heat-decomposable blowing agent is dimethyl-dinitrosoterephthalazide.

7. A method according to claim 1, wherein the heat-decomposable blowing agent is benzene-sulfonylhydrazide.

8. A method according to claim 1, wherein the heat-decomposable blowing agent is toluene sulfonylhydrazide.

9. A method according to claim 1, wherein the heat-decomposable blowing agent is azobisisobutyronitrile.

10. A method according to claim 1, wherein the heat-decomposable blowing agent is diazoaminobenzene.

11. A method according to claim 1, wherein the heat-decomposable blowing agent is trihydrazine-triazine.

12. A method according to claim 1, wherein the heat-decomposable blowing agent is paratoluene-sulfonyl-semicarbazide.

13. A method according to claim 1, wherein the heat-decomposable blowing agent is oxybisbenzenesulfonyl-semicarbazide.

14. A method according to claim 1, wherein the heat-decomposable blowing agent is azodicarbonamide.

15. A method according to claim 1, wherein the thermoplastic resin particles not containing a heat-decomposable blowing agent is polyethylene and the thermoplastic resin particles containing a heat-decomposable blowing agent is polyethylene.

16. A method according to claim 1, wherein the ratio of the thermoplastic particles containing a heat-decomposable blowing agent to the thermoplastic particles not containing a heat-decomposable blowing agent in the mixture is 2 : 1 to 2 : 3 by weight.

17. A method according to claim 16, wherein the particle size of the thermoplastic particles not containing a heat-decomposable blowing agent is smaller than the thermoplastic particles containing a heat-decomposable blowing agent.

* * * * *